July 16, 1968     L. ROBINSON ET AL     3,392,803
ENGINE OIL RECONDITIONER
Filed Oct. 1, 1965     4 Sheets-Sheet 1
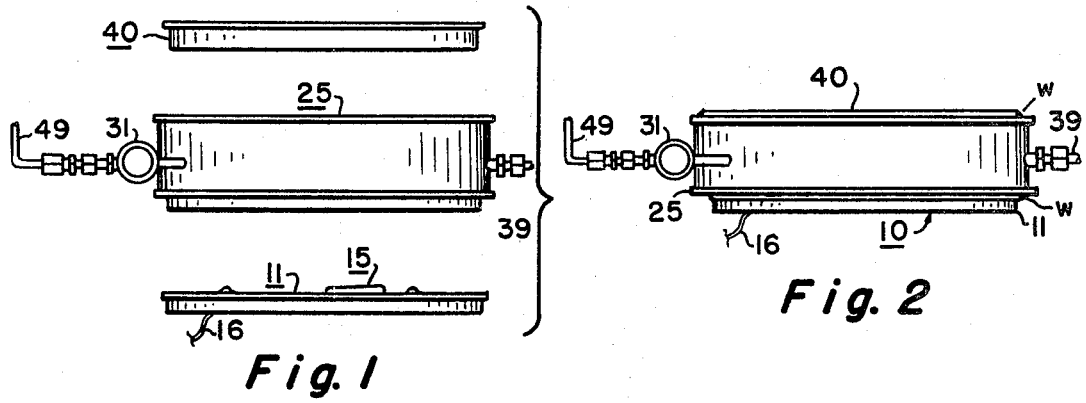
Fig. 1
Fig. 2
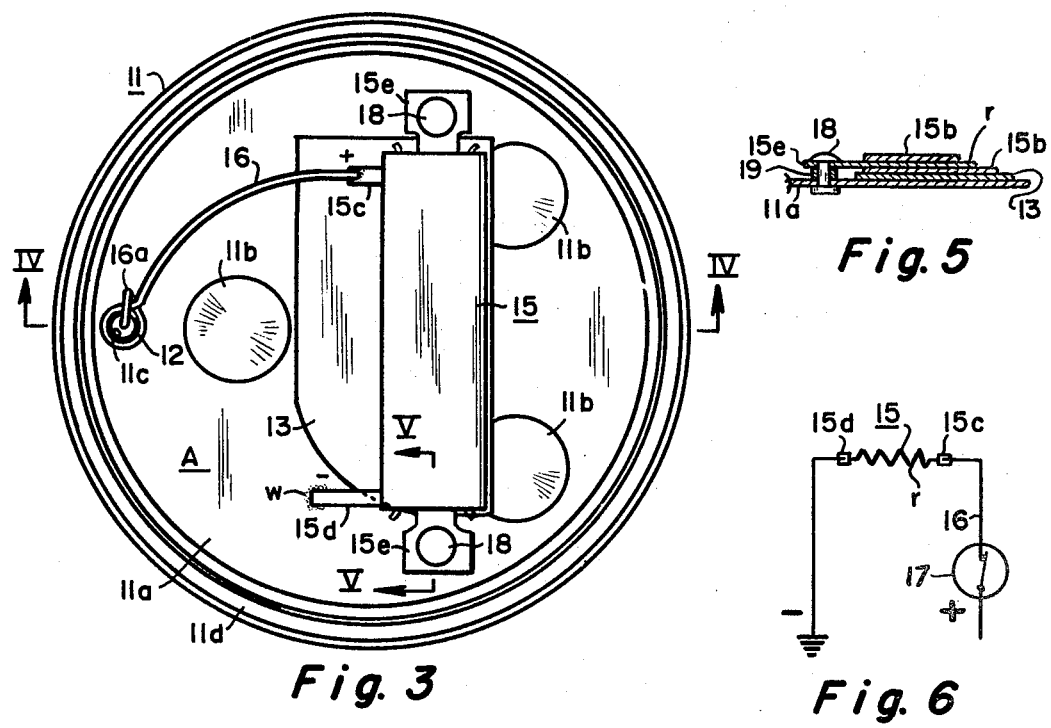
Fig. 3
Fig. 4
Fig. 5
Fig. 6
INVENTORS.
Luther Robinson
Edgar G. Roland
BY
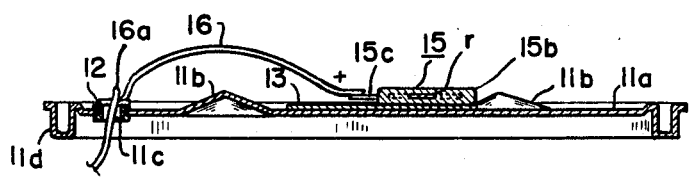
THEIR ATTORNEYS July 16, 1968 L. ROBINSON ET AL 3,392,803
ENGINE OIL RECONDITIONER
Filed Oct. 1, 1965 4 Sheets-Sheet 2

INVENTORS.
Luther Robinson
Edgar G. Roland
BY
Green, McCallister & Miller
THEIR ATTORNEYS

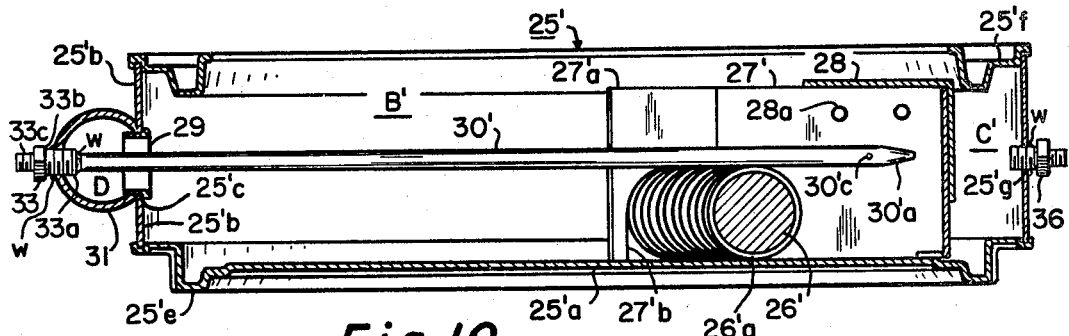
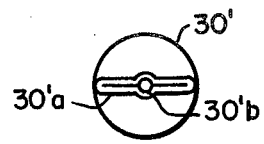
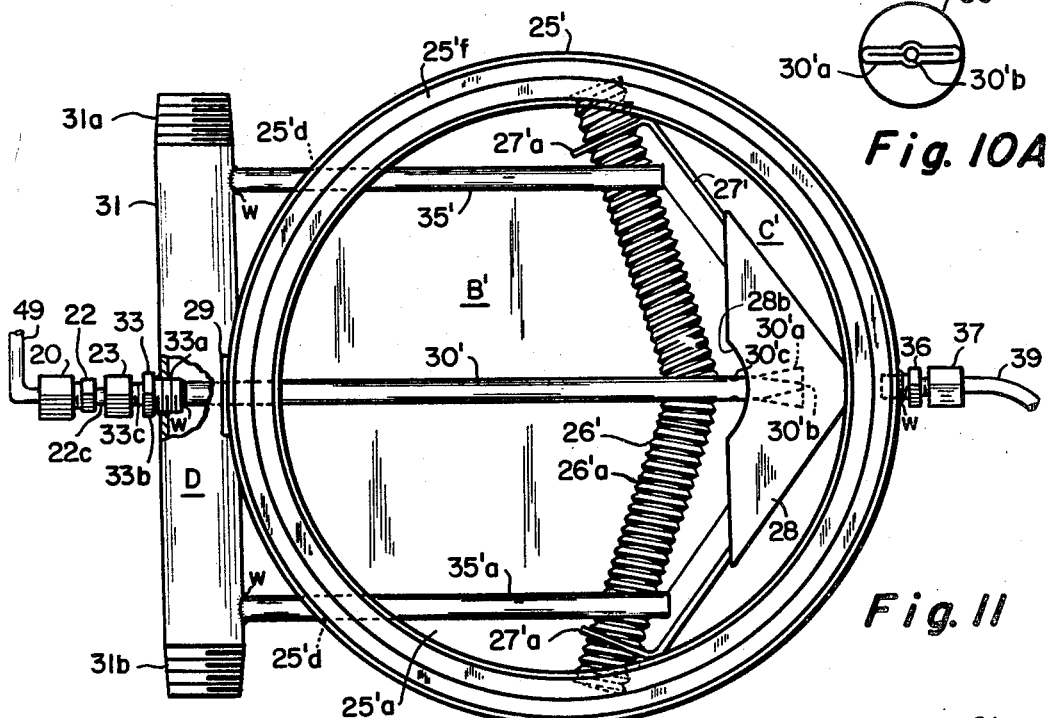
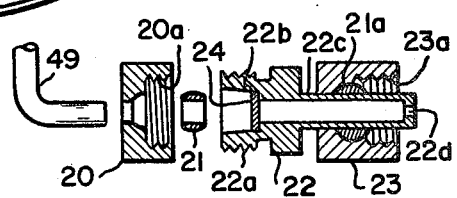
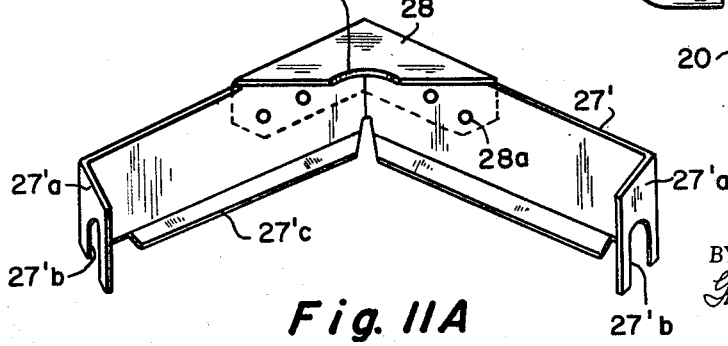

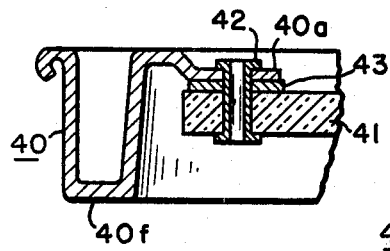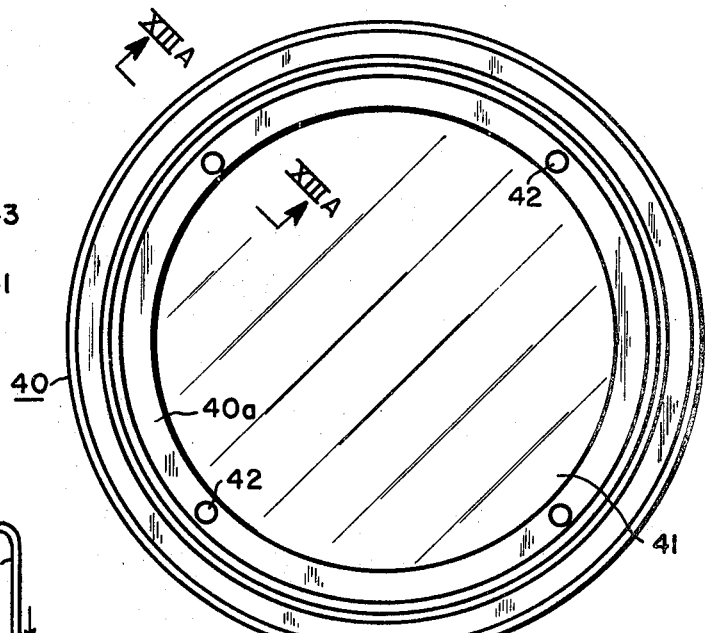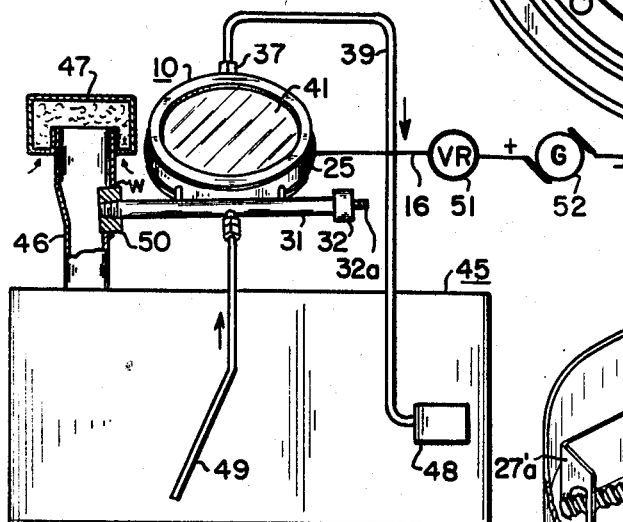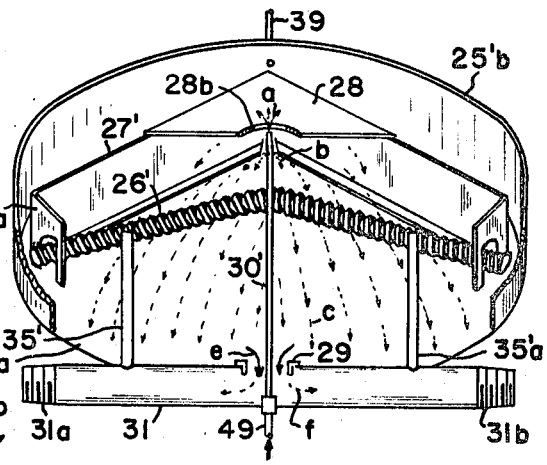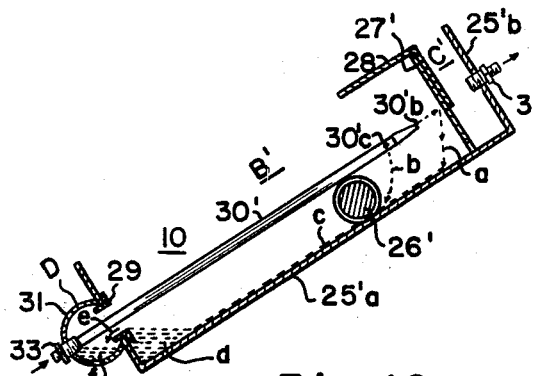

United States Patent Office 3,392,803
Patented July 16, 1968

3,392,803
ENGINE OIL RECONDITIONER
Luther Robinson, 509 Bellair Ave., Pittsburgh, Pa.
15226, and Edgar G. Roland, Box 383, Grand Ave.,
Mars, Pa. 16046
Filed Oct. 1, 1965, Ser. No. 492,018
9 Claims. (Cl. 184—1)

ABSTRACT OF THE DISCLOSURE

A device is provided for use with an internal combustion engine to continuously recondition crankcase oil during the operation of the engine. Oil is continuously bled from the engine, passed through a metering tube and sprayed into an enclosed conditioning chamber upon an upper portion of a sloped heating surface, and is spread and thinned by a cross-extending cathode bar into a downflowing transversely-spread wetting film to flow by gravity downwardly along the heating surface. An upper partition member separates the conditioning chamber from a negative pressure chamber from which volatiles are withdrawn. A pair of pressure equalizing tubes extend into the conditioning chamber to subject it to the pressure in the engine crankcase. Heat is imparted to the under side of the sloped surface to volatilize containants having vaporization temperatures below that of the oil. The volatilized contaminants and reaction products are continuously drawn off from the negative pressure chamber and, in the case of a gasoline engine, are mixed with the fuel in the carburetor and burnt. Reconditioned oil is collected from the lower end portion of the heating surface and returned to the engine.

---

This invention relates to procedure and apparatus for conditioning or reconditioning lubricating oil during the operation of a combustion engine and particularly, for continuously maintaining crankcase oil in good condition for lubricating the engine.

A phase of the invention relates to procedure and apparatus for eliminating sludge formation in the lubricating system of an engine and for eliminating the need for making oil changes.

The present-day trend has been toward the provision of better quality oils, of better engine wearing surfaces, and of improved oil filters in order to permit a longer period of oil usage before it has to be changed. However, we have determined that these approaches do not fully meet the problem and that excessive engine wear may occur where full reliance is placed upon them. In the first place, sulfur is present at least in minimum amounts in lubricating oil of a petroleum, mineral, or hydrocarbon type. It is present in varying amounts in crude oil and may also be introduced during the refining process. Some engineers are of the opinion that when sulfur is present in its elemental form it improved the lubricating properties of the oil; however, moisture condensation, oxygen and gasoline are introduced into the crankcase oil of an engine, due to the heating and cooling of the motor or when not in operation, due to the use of an atmospheric-open oil filler and breather tube, and due to leakage from the combustion chambers during the operation of the pistons.

The moisture which is formed by condensation and moisture which is introduced along with oxygen through the oil filler tube of the engine tend to cause the elemental sulfur in the oil to, during the operation of the engine, change into a more complex or acid form. The acid form is corrosive of the wear parts of the engine, tends to lower the lubricating properties of the oil, and, importantly, tends to cause the formation of a gummy sludge which may contain acid, some sulfur trioxide, etc. This sludge quickly fills the pores of the oil filter which causes the oil to merely by-pass the filter, making it ineffective for removing dirt impurities. An oil filter used for an ordinary internal combustion engine will, after a few hundred miles, collect a heavy coating of sticky sludge, thus necessitating its change if the engine is to be protected.

In endeavoring to find a solution to the problem involved, we found that the proper approach was to effectively condition or recondition the oil during its usage and that if this is properly done, sludge formation will be eliminated, making the oil filter continuously effective and maintaining the oil at its top lubricating efficiency. We have been able to carry out such an approach by continuously taking-off or bleeding oil from the engine during its operation and continuously and progressively conditioning the oil as thus taken-off, and then continuously returning it to the crankcase of the engine. This is done with a by-pass system in such a manner that the acid content of the oil is, in effect, neutralized, and contaminating volatiles, including moisture and gasoline as well as sulfur and carbon oxides, are progressively taken-off from and removed from the oil before it is returned to the engine. Employing this approach, we have found that oil in hard usage for tens of thousands of miles in an automobile is effectively as good in its lubricating qualities as the original oil, and that the oil filter when removed is free of sludge deposits, so that it may effectively collect bits of metal, dirt, and other solid contaminants that might otherwise damage the engine.

Briefly, in accordance with our invention, the oil is conditioned during its usage by subjecting it progressively and effectively to continuous treatment in a relatively simple apparatus in which it is flowed as a film over a heated surface and in contact with a metal catalyst in such a manner that the catalyst acts to neutralize the acid or convert the acid content into an innocuous content and particularly, one which can be volatilized-off. At the same time, heating is effected during the flow of the oil as a film over the heated surface so as to drive-off moisture, gasoline, and carbon and sulfur oxides into the atmosphere. This is accomplished in such a manner that the volatiles are drawn-off under negative pressure into the vacuum system of the engine where they can be mixed with the gasoline in the carburetor and burned up or discharged as exhaust. The treated or reconditioned oil flows back into the crankcase without in any way adversely affecting the normal operation of the engine, since our by-pass system in no way is connected with moving parts of the engine.

It has thus been an object of our invention to devise a solution to the problem of lubricating oil contamination in an engine and in a simplified and practical manner without disturbing the normal operating efficiency of the engine;

Another object of our invention has been to eliminate the formation of sludge in a lubricating system and particularly, to eliminate the collection and clogging of the oil filter with sludge;

A further object of our invention has been to provide a procedure and apparatus which need only operate during the operation of the engine and will incorporate the normal components of the engine without requiring a special electrical or filtering system;

A further object of our invention has been to devise a sludge eliminating and oil conditioning system for an internal combustion engine which will be fully safe and foolproof in its operation and which will utilize any suitable source of electrical current, such as provided by the generator or alternator of an ordinary ignition system of an internal combustion engine, without producing any adverse drain on the storage battery;

A still further object of our invention has been to devise a system which will be fully safe in its operation, without danger of fire hazards;

These and other objects of our invention will appear to those skilled in the art from the illustrated embodiments, the description thereof, and the appended claims.

In the drawings:

FIGURE 1 is an exploded vertical side view showing the construction of an oil conditioning device devised in accordance with our invention, and particularly from the standpoint of interfitting parts which may be employed in its construction;

FIGURE 2 is a vertical view in elevation on the scale of FIGURE 1 showing the parts of the construction assembled and in a position ready for use;

FIGURE 3 is a bottom plan view of a heater compartment part of FIGURES 1 and 2 on an enlarged scale; this view shows a heating element assembly positioned on the inside of a plate member;

FIGURE 4 is a vertical section on the scale of and taken along the line IV—IV of FIGURE 3, showing details of the construction of the bottom part of the container assembly of FIGURES 1 and 2;

FIGURE 5 is a vertical fragmental section on the scale of and taken along the line V—V of FIGURE 3;

FIGURE 6 illustrates a suitable electric circuit diagram for a heating element or unit of the container part of FIGURES 3 and 4;

FIGURE 10 is a full size side section in elevation of a modified and preferred part (compare FIGURE 7) that is employed as a treating or processing compartment part, can or container;

FIGURE 10A is a front end view on an enlarged scale showing a nozzle end of an oil inlet tube of the construction of FIGURE 10;

FIGURE 11 is a top plan view of the treating container embodiment of FIGURE 10 and on a slightly reduced scale;

FIGURE 11A is a horizontal perspective view on the scale of and showing details of the construction of baffle means of FIGURE 11;

FIGURE 12 is an exploded horizontal section on an enlarged scale as to FIGURE 11, showing details of a demountable screening connection for an inlet of the compartment of FIGURE 11;

FIGURE 13 is a top plan view on the scale of FIGURES 8 and 11 of a top enclosure or panel part for both the constructions;

FIGURE 13A is an enlarged vertical fragmental section taken along line XIII—XIII of FIGURE 13A;

FIGURE 14 is a greatly reduced somewhat diagrammatic view in elevation illustrating a typical mounting of a device of our invention with respect to the motor of an automobile, beneath its hood;

FIGURE 15 is a somewhat diagrammatic front end, broken-away view on a reduced scale as to FIGURE 11, showing the flow pattern of the oil or fluid being processed when the container is in its inclined operating position of FIGURE 14; and FIGURE 16 is a side section in elevation on the scale of and taken along the compartment of FIGURE 15, also illustrating flow paths during processing of the oil.

Figure 7:
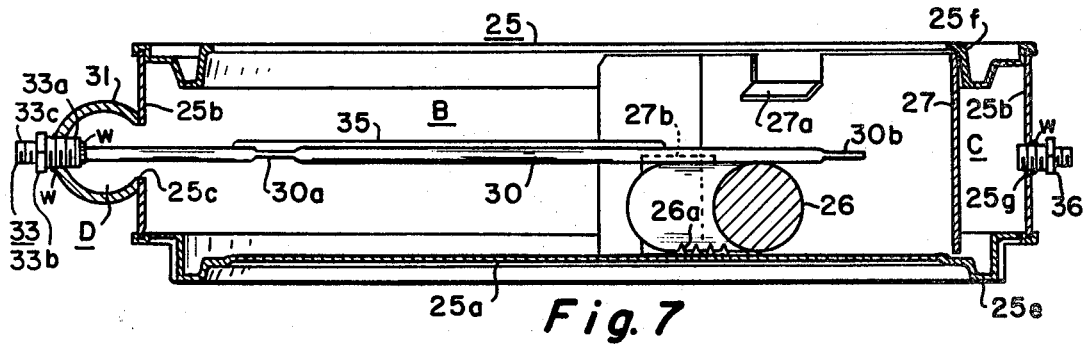
FIGURE 7 is a full size side section in elevation through one (central or main) part of the device of FIGURES 1 and 2, namely, through a treating or processing compartment part, can or container, showing details of its construction.

With reference to FIGURES 1 and 2 of the drawings, we have illustrated an oil conditioning device 10 embodying our invention which is made up or employs container or can parts 11 and 25 and a face plate or front closure part 40. The three parts have interfitting or complementary peripheral tongue and groove flanges for facilitating their friction-fit assembly in a sealed-off relation and for permitting their disassembly. FIGURE 1 shows the parts in an exploded relationship and FIGURE 2 shows them in a fully assembled unitary relationship. Although any suitable means, such as metal screws, may be employed for securing them together, we have shown brazing spots $w$ in FIGURE 2 by way of illustration.

FIGURE 14 somewhat diagrammatically illustrates how the device 10 may be mounted above the cylinder head of an internal combustion engine of a vehicle such as an automobile, underneath its hood. In this connection, the unit 10 has a transverse outlet or oil return flow pipe member 31 which is threaded at its opposite ends (see FIGURES 8, 11 and 15) so that one end 31a may be used for mounting it to project horizontally from a conventional oil filler and air breathing pipe 46 of an engine 45 of a car or truck, such as manufactured by Ford or Chrysler. The other threaded end 31b may be used for mounting it on the oil filler and breathing pipe of General Motors cars. The opposite threaded end which is not thus mounted is provided with an internally-threaded closure fitting or cap 32 to close it off (see FIGURE 14). The closure cap 32 may be provided with a projecting threaded stem 32a for receiving a nut to secure it to a mounting arm or bracket (not shown) extending from the body, frame or engine of the vehicle. Although ordinarily the unit 10 is sufficiently rigid by reason of the mounting of the other end of the pipe member 31 on the pipe 46, additional rigidity may be provided by also securing the stem 32a at the other end of the member 31 to the engine 45 or other suitable part of the vehicle.

The connecting and mounting pipe 31 is shown mounted below a conventional removable filler cap 47 by side-tapping the tube 46 and brazing or welding-in an internally-threaded fitting 50. It will be noted that the cap 47 has air breathing openings so that the tube 46 is, in effect, always at atmospheric pressure. The device 10 of our invention may, however, be connected at its oil delivery end to any suitable crankcase opening.

Figure 8:
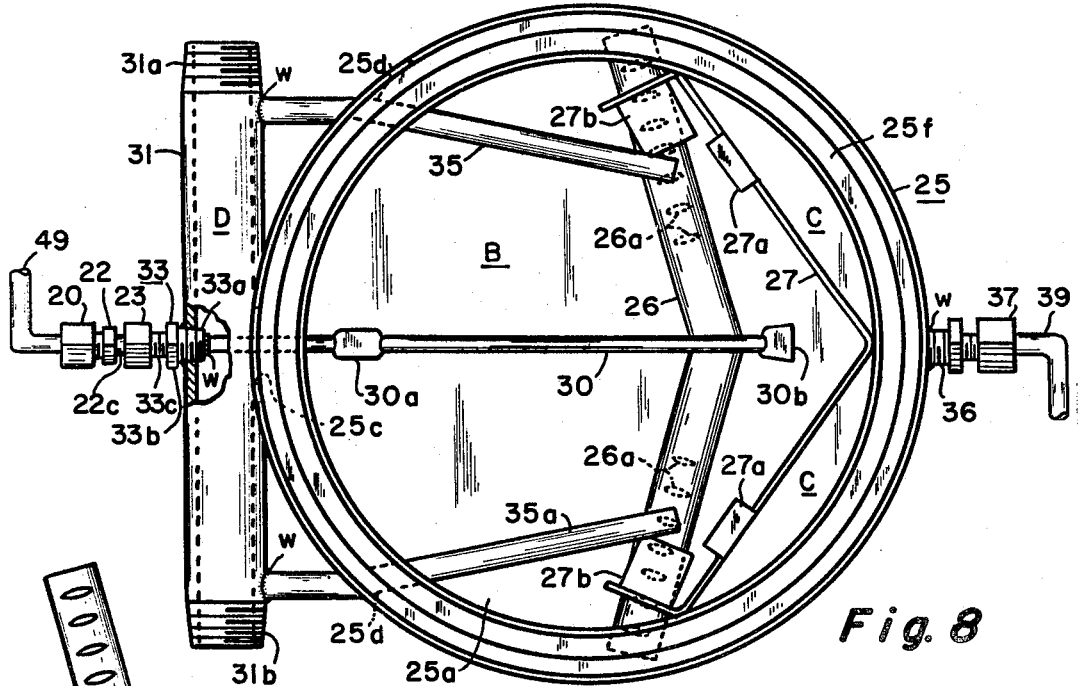
FIGURE 8 is a top plan view on a slightly reduced scale of the container of FIGURE 7, showing its fluid inlet, outlet and mounting connections.

Contaminated oil from the engine 45 is fed or bled-off from its crankcase by metal tubing 49 which passes centrally-upwardly through the pipe 31 along an inlet tube 30 into a treating chamber B that is provided by the container part 25 of the device 10 of FIGURES 7 and 8. The tubing 49 is shown connected by a screw coupler part or sleeve 20 (see FIGURES 8, 11 and 12) and a pressure collar or sleeve 21 to a male fitting part or element 22. The part 22 is shown provided with a slightly outwardly-enlarged bore within its externally-threaded male or boss portion 22a that defines a seat or ledge 22b with the reduced bore of its forwardly-extending pipe end portion 22c. The seat or ledge 22b is adapted to removably-receive a screen element 24 that prevents solid particles of dirt from entering the unit 10. A second screw coupler or sleeve part or element 23 fits over the pipe end portion 22c of the intermediate part 22 and is provided with a pressure-fit collar or sleeve 21a for securing it thereon. The coupler or sleeve part 20 has a threaded bore or female threaded portion 20a that is adapted to cooperate with the male threaded portion 22a of the fitting part or element 22 to both secure the part together and, in cooperation with the pressure ring 21, secure the end portion of the tubing 49 to the part 20.

Where a restricted flow passage is provided, as by flattened portion 30a of oil inlet tube 30 of the compartment embodiment 25 of FIGURES 7 and 8, the pipe end portion 22c may be fully open from its front end through its bore. However, where as shown in the compartment embodiment of FIGURES 10 and 11, the oil inlet tube 30' is not, itself, provided with a restricted flow passage, the flow restriction may be provided by partially closing the end of the pipe end portion 22c to, as shown in FIGURE 12, provide it with a small port or restricted flow passageway 22d. The screw coupler 23 has a female threading or threaded bore portion 23a that is adapted to cooperate with a reduced male threaded end portion 33c of a male fitting part 33. As shown in FIGURES 7 and 8, the fitting part 33 has an enlarged male, forward, threaded end portion 33a for screwing it in position within a threaded, centrally-located opening in the pipe 31, has a wrench flat 33b, and has a smaller threaded end portion 33c for abutment with pressure sleeve 21a to simultaneously secure the end portion 22c of the part 22 to the part 23 and the part 23 to the part 33.

It will be noted that screw coupler part 37 of FIGURES 7, 8, and 10, 11 is of similar construction to the coupler part 20 and that negative pressure fitting part 36 is similar in construction to the fitting part 33. Negative or vacuum pressure is applied to a top vacuum chamber C of the container part 25 of FIGURES 7 and 8 which has a threaded male fitting 36 that is connected by a screw coupler 37 and metal tubing 39 to the vacuum system of the engine or directly to the air intake of its carburetor 48 (see FIGURE 14). Although the pipe connection 31 serves as a secure main mounting for the unit 10, the piping 49 and parts 20, 23, 33 and piping 39 and parts 36, 37 provide supplemental mounting in the sense of securing the device 10 to the motor 45 in such a manner that it does not vibrate independently thereof. It will be noted that an adaptor fitting 50 (see FIGURE 14) is contructed for securing, as by brazing metal w, to the filler tube 46. It thus serves as a secure mounting for the pipe 31 and the unit 10. We also contemplate employing U- or L-shaped brackets (not shown) that may be mounted on the engine block and secured or clamped over a fitting part, such as 36, to provide further stability to the unit or device 10, when desirable.

Referring particular to FIGURES 1 to 5 of the drawings, the can or container part 11 represents a bottom or back cover of the device 10 whose housing defines a heating chamber A. The housing of the front can or cup-shaped container part 25 (see FIGURES 7 and 8) defines an oil treating chamber B and with a baffle or partition member 27, further defines vacuum chamber C. The cross-extending oil outlet pipe 31 is brazed to the bottom of the can 25 and is connected through an open central outlet orifice 25c (see FIGURES 7 and 8) to the bottom of the treating chamber B to thus define a collecting and return chamber D for conditioned oil. In view of its atmospheric type of connection, the pipe 31 serves as a pressure-equalizing chamber from the standpoint of the vacuum chamber C and with respect to the treating chamber B.

The container or can 11, as shown particularly in FIGURES 3 to 5, is adapted to receive a heating unit or assembly 15. The heating unit 15 may be of any suitable type, but is illustrated as a relatively flat electrical resistance wire unit, such as is commercially available. By way of example, a five ohm resistance has been found to be satisfactory for a 6 volt system and a ten ohm resistance for a 12 volt system. By employing a higher resistance than necessary, the unit 15 has a long period of life even if subjected to voltage surges. As shown in FIGURES 4 and 5, the unit 15 has a conventional wound resistance wire r, that is enclosed in a resin or other suitable heat-resistance envelope 15b, that is connected at one end by a connector lug 15c with the positive side of a source of electrical energy (AC or DC), and that is connected at its other end by a connector lug 15d to the negative side of the energy source. As shown in FIGURES 3 and 4, the connector lug 15c may be connected by an insulated wire or cable 16 that is looped at 16a and extends through an insulated bezel or ring 12 that is fitted in a hole 11c in the back wall 11a of the part 11. The other end of the wire 16 may, as shown in FIGURE 14, be connected through a voltage regulator 51 of the vehicle to the positive side of a storage battery, ganerator or alternator 52. It is also desirable to connect the resistance unit through the ignition switch of the vehicle or automobile, in order that it will only function or become energized when the motor is operating or running. The lug 15d is shown soldered or brazed at w to the metal back wall 11 and thus to the ground of the metal parts of the vehicle. If the unit 10 or some of its parts (such as the wall 11a) are made of a heat but not electrically conductive material, then a separate ground wire will be connected between the lug 15d and the nearest ground to the source of electric current.

The unit 15 is shown positioned on an insulating sheet or piece 13, such as of fiber glass or asbestos material, to protect it from the metal wall 11a and as having a pair of outwardly projecting end mounting tabs 15e. The tabs 15e are integral portions of a heat-conducting, longitudinal, relatively flat, metal core or support for the resin envelope 15b within the thickness of which resistance wire winding r extends. Metal rivets 18, having tab-supporting metal spacers or collars 19, secure each tab 15e to the metal back wall 11a in a heat-conducting relation. Punched-in projections 11b are provided in the wall to strengthen it and to serve as mounting aligners for the unit 15 and its insulating sheet 13.

In FIGURE 6, we have shown a circuit diagram for the resistance heating unit 15. Although any other suitable type of heating means may be provided, such as a tube envelope type, we have found that the unit 15 is highly satisfactory in providing or maintaining a processing temperature for oil being conditioned in the chamber B within a range of about 250° to 350° F. which is suitable for a gasoline engine, and as compared to 400°–500° F. for a diesel engine. We have also shown a conventional thermostatic or temperature-sensitive switch 17 in the electrical lead 16 which may be used where substantial variations in the current supply occur. The switch 17 has a heat-sensitive arm that will remain closed when the current flow is of the requisite value to maintain a proper temperature of the heating unit 15 and will open momentarily when the current flow tends to produce too high a temperature.

The containers 11 and 25 as well as the front closure part 40 may be of sheet metal construction, such as of tin or tin-coated carbon steel or lightweight stainless steel. The back, heating element housing part, container part or can 11 is provided with a back or bottom closure wall 11a, and a circular side wall defined by a U- or channel-shaped peripheral rim or flange 11d. The flange 11d provides an annular, upwardly-open recess to receive a bottom, tongue-shaped, annular peripheral flange 25e of the can part 25.

The main or treating chamber container part or can 25 (see FIGURE 7) is provided with a flow plate, back oil-heating wall or grid member 25a of plate-like construction which serves as a front closure member for the heating means or element 15, is shown smooth on its inner or flow surface, is of a good heat-conducting nature, and preferably has an inner flow face or surface that is reflective. It will be noted that the heating element 15 is in a spaced-apart, heat-transferring relation with respect to the plate 25a when the parts 11 and 25 are assembled or secured together. The chamber A not only supplies heat energy through its space, but also through the heat-conductive relation of the metal parts of the cans 11 and 25.

The container or can 25 is shown provided with a circular side wall 25b and, like the container 11, with a front peripheral or encircling, inwardly-projecting, upwardly-open recess or groove-defining, channel or U-shaped flange or rim portion 25f. The back wall 25a has, adjacent its outer periphery, a channel or U-shaped, peripheral flange or rim portion 25e that is inwardly or upwardly open to define a tongue-like portion which provides a complementary interfitting fit with the flange 11d of the container part 11.

The front closure part 40, as shown particularly in FIGURES 1, 13 and 13A, has a tongue defining, channel or U-shaped, outer flange or rim portion 40f and an inwardly-offset and projecting, substantially flat, peripheral flange or rim portion 40a. The portion 40f is adapted to form a complementary tongue interfit with the recess or groove of the flange portion 25f of the container 25 (see FIGURE 2). The portion 40a serves as a mounting for a transparent glass or resin face plate or window member 41 which is shown of circular construction. As illustrated particularly in FIGURE 13, the face plate 41 enables the operator to view the flow and treatment of the oil within the treatment chamber B of the container part 25. It may be secured or mounted in a protected and insulated relation on the underside of the flange portion 40a by a layer of sealing cement 43. Both the flange portion 40a and the face plate member 41 may have complementary openings therethrough to receive rivets 42.

As shown particularly in FIGURES 14 to 16, the unit 10 (employing either container 25 or 25') is adapted to be mounted in a vertically-downwardly tilted position from its top to its bottom portion which, as an optimum, is about 45° with respect to the horizontal, but may have a slope within a range of about 40° to 75°. It also has a slight tilt towards the side or end of the transverse pipe member 31 which is connected to the oil filler tube 46, so as to provide a gravity return flow of reconditioned or treated oil back to the crankcase of the engine 45. The upper, backward, vertical tilt of the device 10 controls the rate of flow of a film of oil over the front or flow face of the plate member 25a or 25'a.

In the container 25, a metal baffle 27 of angle-shape (see FIGURES 7 and 8) of somewhat flexible strap-like metal material is shown positioned within the upper portion of the chamber B to separate the treating chamber B from the vacuum chamber C. It will be noted that the apex of the baffle 27 is substantially in line with the apex or extreme top end of the container 25. Since the bottom edge of the baffle 27 rests tightly upon the face of the plate 25a, it serves as a segragating partition between the two chambers to keep the oil out of the vacuum chamber. However, as shown in FIGURE 7, there are passageways between the two chambers for flow of vaporized contaminants from the chamber B into the chamber C. The baffle 27 has a pair of downwardly and forwardly slit tabs 27a, adjacent its opposite end portions, to define two vapor circulating passageways between the two chambers so as to pass vapors from the treating chamber B into the vacuum chamber C and to equalize pressure in the treating chamber B as between the negative pressure of the vacuum chamber C and the positive atmospheric pressure of the collecting chamber D.

A metal cathode bar or member 26 of angle-shape is positioned to extend across the chamber B and to project through openings provided by end tabs 27b of the baffle 27. It will be noted that the bar 26 is positioned with its end portions extending downwardly from its centrally-located apex. The end tabs 27b serve to hold the cathode bar 26 along its length in position on the face of the heating plate member 25a. Oil inlet tube 30 of a suitable metal, such as copper, is adapted to extend upwardly through the pipe 31 and outlet opening 25c in the bottom of the container 25. The tubing 49 which serves as a supply line for oil to be conditioned, introduces the oil to the downstream, inlet or lower end of the tube 30, and may be connected to the pressure pump in the crankcase of an automobile. Thus, contaminated oil may be continuously bled or taken-off from the crankcase of the engine 45 as a pressure flow through the tubing 49 and the inlet tube 30.

By way of example, the tube 30 may have an inside or flow diameter along its main length portion of about 1/16 or 1/8 of an inch (preferably the latter). However, it is shown provided with a restricted flow passage at 30a. The portion 30a may be formed by first inserting a wire in the tube of the desired diameter and crimping or flattening the tube thereon. This provides a small flow control or metering passageway to limit the flow of oil to an amount which can be fully conditioned within the device. This restricted opening may have a diameter of about .020 of an inch to provide a flow rate of about one gallon of oil for about eight minutes of operation. In the container embodiment 25' of FIGURES 10 and 11, the flow restriction may be provided by port or passageway 22d in the outlet end of the fitting 22 (see FIGURE 12).

Figure 8A:
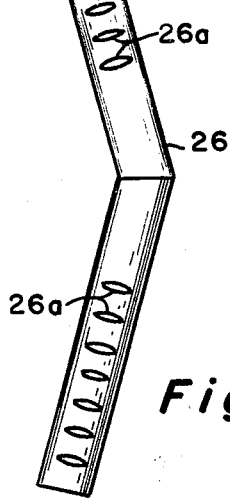
FIGURE 8A is a bottom plan view on the scale of FIGURE 8 showing details of the construction of a metal catalyst bar or member used in the container part of FIGURE 8.
Figures 8B, 9:
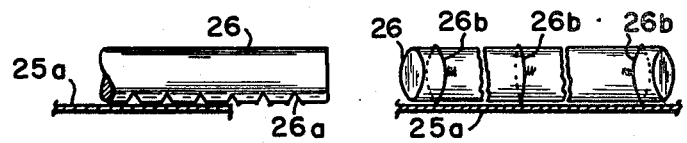
FIGURE 8B is a fragmental view in elevation showing the mounted relationship of the metal bar of FIGURE 8A on the scale of such figure and with respect to a heated grid, flow plate or back wall member of the container part of FIGURE 8.
FIGURE 9 is a broken fragmental view on the scale of FIGURE 8B, showing a modified spacing means for the metal bar.

The upper end of the inlet tube 30 is positioned to deliver the oil into the upper portion of the chamber B above the cathode bar 26, below and against the baffle member 27. If desired, a flat spray end or nozzle 30b may be provided. The desired type of oil delivery is substantially equal from the standpoint of both vertical halves of the chamber B. The baffle 26 serves to confine the oil to the treating chamber and to spread it substantially over the full width of the face of the plate 25a. To further assure the desired type of flow, the cathode bar 26 has spaced passageway portions with respect to the face of the heating plate or wall member 25a, such as provided by cross-slots 26a and the slight projection of their side edges (shown in FIGURES 8A and 8B of the drawings), or as provided by spacer wire rings 26b of FIGURE 9. If the rings 26b are used, one may be positioned at the apex of the bar 26 and one may be positioned adjacent each end thereof. These cross-cuts 26a on the underside of the bar 26 have a slight raised relationship along their side edges, as by forming them by pressing-in the metal of the bar. Another way of providing this same spacing is to employ central and end cross ribs on the underside of the member 26. Such spacing as an optimum should be about .023 of an inch, but may be within a range of about .020 to .026 of an inch.

In the container embodiment of FIGURES 10 and 11, bar 26' is provided with relatively coarse or wide threads 26'a therealong; the crests of the threads serve as highly effective spiral ribs along the bar 26' to provide spiral spacing that is most effective in assuring a full width of substantially equal thickness of oil sheet or film flow c (see FIGURE 16) down along the inner face of the plate wall 25'a.

Since the contaminated oil being introduced in the treating chamber B falls upon the cathode bar 26 and flows thereunder through the spacing between it and the plate member 25a, this provides a thin film of heated oil c which follows downwardly substantially uniformly over the entire width of the surface of the plate member 25a, as may be witnessed by inspection through the front face plate or window 41. In this manner, the oil is fully subjected to a neutralizing reaction as to its acid content by the cathode bar 26 and to the heating effect of the plate member 25a, so that if the engine is operating at a normal temperature of about 180° for a gasoline engine, the oil will be additionally heated about 70° to 120°. That is, the oil being treated should have a temperature during its downward flow from the cathode bar 26 within a range of about 250° to 350° F., preferably about 250° to 300° F.

The treated or conditioned oil flows out through the outlet opening 25c and the pipe 31 to return to the crankcase of the engine, as through its filler tube, such as 46 of FIGURE 14. A pair of upwardly-projecting pressure-equalizing pipes or tubes 35 and 35a extend along opposite sides of the container part 25, and their lower ends are open to adjacent end portions of the pipe 31. The tubes are shown sealed-off and secured to the container 25 and the pipe 31, by brazing metal *w*. The tubes 35, 35a may have an inside diameter of about $3/16$ or .1875 of an inch. When the threaded end portion 31a is, as shown in FIGURE 15, connected to the filler tube 46 of the engine, then the tube 35 functions as the pressure equalizing tube. On the other hand, when the opposite threaded end 31b is secured to the oil filler tube of the engine, the tube 35a serves as the pressure equalizing tube. Thus, there is no danger of oil being drawn into the vacuum chamber C and drawn off in the vacuum line 39 of the system if the vacuum should become excessive.

The tubes or pipes 35 and 35a are shown mounted in tight abutment with the front side of the bar 26 and thus serve to hold it securely in position within the treating chamber B. Since the tubes 35 and 35a and the pipe 31 are connected to the crankcase of the engine, they also serve to conduct vapors or moisture from the crankcase (as a counterflow to the return of the reconditioned oil) into the treating chamber B, where they are removed along with vapors produced by the heating plate 25a.

In FIGURES 10 to 11A, we have illustrated a preferred embodiment of our invention from the standpoint of the construction of the oil processing or conditioning chamber unit. In this construction, the can or container 25' is similar to the construction of the container 25 of FIGURES 7 and 8 from the standpoint of its back or bottom wall 25'a, its enclosing side wall 25'b, its bottom discharge opening 25'c, and its mounting flanges 25'e and 25'f. The processing unit of 25', however, has what we have found to be a more efficient operating construction. Oil inlet tubing 30' is shown unrestricted as to its flow path along its length, since its restriction is provided by orifice 22d in the fitting 22 of FIGURE 12. Although the screen 24 tends to eliminate clogging and can be readily replaced by unscrewing the fittings of FIGURE 12, the orifice 22d can be flushed out at the same time, all without disturbing the mounting of the inlet flow tube 30'.

The top or outlet end 30'a of the inlet tube 30' is shown crimped or flattened (see FIGURE 10A) to provide an axially-centered restricted flow orifice or nozzle 30'b. Also, an opposed pair of side orifices 30'c are shown provided with holes cut in the front end portion of the tube 30' adjacent the crimped end portion 30'a. It will be noted that any suitable shape or construction of spray nozzle may be employed, such as a pointed end nozzle. The flow pattern thus provided is illustrated by the arrows *a* of FIGURES 15 and 16 of the drawings, with reference to the orifice 30'b, and by the arrows *b*, with reference to the orifices 30'c. In this manner, contaminated oil introduced into the treating or conditioning chamber B' is spread against an angle-shaped baffle element, part or plate member 27' which separates the chamber B' from the top or vacuum chamber C', confines the oil within the chamber B', but provides passageways for vapor flow from the chamber B' to the chamber C'.

The ends of the baffle part 27' (as shown particularly in FIGURE 11A) are turned or bent inwardly to provide angle-shaped end portions or tabs 27'a. Each of the pair of tabs 27'a is provided with a downwardly-open, edge slot portion 27'b to receive and rest upon adjacent end portions of anode bar 26' and securely hold it in position, as illustrated particularly in FIGURE 11. The main body portions of the baffle 27' are bent upwardly and backwardly along their bottom edges to form positioning flanges 27'c that are adapted to rest against the upper face of the face plate or back wall 25'a. The flanges 27'c provide additional stability in the positioning of the baffle 27' within the container 25'. An angle-shaped, apex or top hood part 28 is shown secured by rivets 28a to the main body portion of the baffle 27' and, as particularly shown in FIGURE 11, the hood part 28 is cut out centrally of its back edge to provide a crescent-shaped portion 28b adjacent the side orifices 30'c of the inlet flow pipe 30'. The baffle 27 is preferably of somewhat flexible metal construction, so that it can be tightly-fit within the container 25', with its apex portion underneath the top flange 25'f, and with the shoulders of its tab portions 27'a in cross or opposite abutment with an inner wall portion of the flange 25'f.

In the preferred embodiment of our invention, cathode bar 26' is provided with oil flow and distributing passages therebeneath and with respect to the face of the back wall 25'a by relatively wide-spaced threads or threading 26'a. These are highly effective in slowing down the flow of oil from the delivery and distribution area between the baffle 27' and the anode 26', such that it cannot escape below the anode 26' as a heavy-thickness or non-uniform flow. In other words, the flow is a thin film that is uniformly spread along the full width or transverse extent of the wall plate 25'a, below the anode part 26'. The construction also prevents splashing of the window 41 of the face plate 40 with oil. The oil should be maintained at a suitable contaminant vaporizing temperature during its downward flow over face plate 25'a, as may be accomplished by the heating element 15. The face plate 25'a, not only assures the retention of a suitable temperature of the oil, but brings oil of cooler temperature up to the operating temperature.

By reason of the temperature of the oil in the container 25' and the restricted and evenly distributed flow path provided by the anode part 26' downwardly along the face of the plate member 25'a (indicated by the arrow *c* of FIGURES 15 and 16), the oil film is maintained at a maximum thickness of about $1/16$ of an inch. A working range of film thickness is about $1/64$ to $1/16$ of an inch; an operating optimum is about $1/64$ to $1/32$ of an inch. The thinner the film *c* with full surface wetting or coverage, the more effective the conditioning action. That is, the flow must be sufficient to cover the face plate with oil. The oil flows relatively slowly downwardly on the face plate 25'a to collect at the bottom of the container 25' (as indicated by *d* of FIGURE 16); it thereafter flows out over the lip of a coupling sleeve 29 (as indicated by the arrows *e*), and thereafter flows (as indicated by the arrows *f*) through the pipe 31 to return to the engine. The sleeve 29 may be brazed or welded in position to extend through the oil discharge opening 25'c of the container 25.

Heat is applied to the oil film moving slowly down the face plate 25'a (by reason of the inclination of the unit 10), in such a manner as to cause an effective release of contaminating vapors, such as those of water and acid which rise and escape from the chamber C' through the vacuum piping 39. We have found that even if the oil is vaporized that water and acid will be entrained in it, and that it is necessary to provide a thin flow film for effecting the effective release of contaminating lower boiling point vapors from the oil.

The pair of pressure equalizing tubes 35' and 35'a may be of the same general construction as the tubes 35 and 35a of the embodiment of FIGURE 8, but are shown extending in a straight line vertically-upwardly from the return flow pipe 31. It will be noted that the pipes 30', 35' and 35'a all rest against the upper side of the anode bar or part 26'. In this embodiment of our invention, the inlet pipe 30' may have a larger inner diameter, for example, $3/16$ of an inch, as compared to $1/8$ of an inch for the pipe 30 of the embodiment of FIGURE 8, to thus provide a faster flow of oil. The device of the embodiment of FIGURE 11 has a greater effective processing capacity. For example, one quart of oil may pass through the container 25' about every two minutes, even although this particular unit enables the oil to be flowed in a thinner film over the plate 25'a which approaches a wetting of the surface of the plate 25'a. We have also found that the securing of the tubes 35' and 35a, the sleeve 29, and the container 25' to the outlet pipe 31 may be facilitated by using copper rings which are melted-down about the joints in a furnace.

Although other suitable catalytic materials may be suitable for the purpose of our invention, we have found that a bar of magnesium metal, such as sold commercially by Dow Chemical Corporation of Lyndhurst, N.J., and designated as AZ–61A is highly satisfactory. As previously indicated, it serves generally as a catalyzer for the acid content of the oil which may be in the form of sulfuric acid ($H_2SO_4$) or sulfurous acid ($H_2SO_3$) or both, and which may contain some crystals of sulfur trioxide ($SO_3$). This catalyst enables the acid sludge forming content of the oil to be neutralized by converting its acid content into water and sulfur dioxide gas which are, in turn, vaporized out of the oil in the chamber B along with carbon dioxide gas, moisture and gasoline. The vacuum or negative pressure provided by the chamber C is sufficient to draw-off these volatiles, as by conducting them to the vacuum system of the automobile where they may be discharged, for example, through the carburetor to the exhaust. Thus, the oil which reaches the bottom end of the plate 25a is fully purified or treated ready for reuse.

Since the device 10 only operates during the operation of the engine and when its electrical heating elements are energized, as by turning the ignition switch, it is apparent that it is economical and uses energy generated by the generator only during the operation of the vehicle. It progressively and continuously conditions and reconditions the oil during its use. By this method, we remove the sludge making constituents or contaminants in the oil so as to always maintain it in good working or lubricating condition. Sulfur which, as previously pointed out, may be contained in the oil as supplied or may be introduced during the operation of the engine, combines with water of condensation and oxygen, and particularly under the pressure circulation through the crankcase to create an emulsion which will, later turn into a sludge. Using the device of our invention, the emulsion never turns into a sludge, in that the contaminants which produce it and which lower the lubricating value of the oil are continuously eliminated before they can be converted into a sludge. This not only results in a substantially unlimited period of effective utilization of a given crankcase filling of oil, but gives the oil filter a useful and effective life that extends into thousands of miles. The filter need only be replaced periodically, for example, after 20,000 or 30,000 miles by reason of dirt accumulations, as distinguished from oil sludge accumulations which normally accumulate within a couple thousand miles depending upon the condition of the motor and the dust content from road operation. The oil filter now will fully effectively remove grit, dirt, small pieces of metal, etc., that would otherwise damage the engine if the filter was by-passed by reason of sludge accumulated therein. Our device also serves as a protection to the engine if water leaks into the crankcase due to a defective gasket, since the water is vaporized-off and does not remain in the oil, giving the false impression that the crankcase is filled with an operating content of oil.

We also contemplate using a suitable adaptor or connector, such as 46, that may be of previously formed unitary or one-piece construction with the fitting 50 to facilitate the mounting of our device 10 without the need to later braze-on the fitting. The connector or adaptor may thus be furnished with the device for ready mounting. It will be of a type suitable for the particular use, for example, it may be constructed for connection in the crankcase return line of a diesel engine. In FIGURE 14, we have shown the cap 32 provided with an endwise-projecting threaded stud for use with an engine-mounted bracket, if further mounting stability is required for the device 10.

Although for the purpose of illustration, we have described our invention as applied to an internal combustion engine, such as a gasoline engine of the type used for motor vehicles, it will be apparent that it may also be employed with diesel and other types of engines, whether for vehicular or stationary utilizations. The source of current for heating the device can be a conventional ignition or glow tube supply source or any other suitable supply source. Also, although we have illustrated exemplary constructions embodying the principles of our invention, it will be apparent to those skilled in the art that various modifications and changes and adaptations may be made in accordance with the principles thereof without departing from its spirit and scope as indicated by the appended claims.

What we claim is:

1. A method of continuously reconditioning lubricating oil that is contaminated by usage in the crankcase of an internal combustion engine and of disposing of volatiles contained in the oil during the operation of the engine which comprises, providing a treating chamber having a downwardly-sloped plate member and providing a vacuum chamber above the treating chamber, withdrawing contaminated oil from the engine and introducing it under positive pressure into the treating chamber, flowing the contaminated oil as a thinly-spread film downwardly on the plate member within the treating chamber and subjecting it to heat imparted from the plate member sufficient to vaporize off contaminants therefrom, passing the oil through restricted passageways between a metal catalyst bar and the surface of the plate member during its downward flow, maintaining a substantial pressure equilibrium in the treating chamber, flowing volatilized contaminants from the treating chamber into the vacuum chamber, withdrawing the volatilized contaminants from the vacuum chamber and introducing them into gasoline within a carburetor of the engine, and collecting conditioned oil from a bottom portion of the plate member and continuously returning it to the crankcase of the engine.

2. A method as defined in claim 1 wherein, the contaminated oil is flowed as a thin film downwardly along the plate member at an inclination of about 40° to 75° to the horizontal, and heat is imparted to the plate member during the operation by an electric heating element positioned on and along the underside thereof.

3. A method as defined in claim 1 wherein, the contaminated oil is metered before its introduction into the treating chamber and is sprayed as a thin film on an upper portion of the plate member for downward flow therealong and through the restricted passageways between the cathode bar and the plate member.

4. An oil reconditioning device for a combustion engine which comprises, an enclosing housing defining an oil conditioning chamber and an upper vapor collecting chamber, said housing having a downwardy-declining wall member closing-off one side of said chambers, baffle means positioned across an upper portion of said wall member to separate said oil conditioning and vapor collecting chambers, said wall member having an upper surface defining an oil flow face therealong, means for introducing contaminated oil from the engine adjacent a lower side of said baffle means, means positioned across said upper surface in an adjacent and spaced relation below said baffle means and defining a plurality of restricted oil flow passageways with said upper surface to spread contaminated oil as a thin wetting oil film over said upper surface for downward flow movement of the oil film on said upper surface, means for applying heat energy to the oil film moving downwardly on said upper surface to vaporize-off contaminants therefrom, vapor flow passageways between said chambers, means connected to said vapor collecting chamber for removing vaporized-off contaminants therefrom, means for collecting conditioned oil from a lower portion of said upper surface to return it to the engine, and said means positioned across said upper surface is an angle-shaped metal bar provided with relatively coarse threading therealong and mounted in close abutting relation with said wall member adjacent an upper end portion thereof and defining a plurality of oil flow passageways with respect thereto.

5. A device as defined in claim 4 wherein said means for applying heat energy is an electric heating element positioned on and along an opposite side of said wall member.

6. A device as defined in claim 4 wherein, said means for introducing contaminated oil from the engine is an inlet tube extending within said housing and having a spray outlet for directing contaminated oil on the upper surface of said wall member below said baffle means and above said metal bar, and said metal bar is a catalyst bar for facilitating reconditioning of the oil.

7. A device as defined in claim 6 wherein oil metering means is removably-carried by said inlet tube.

8. A device as defined in claim 6 wherein a tube connects said vapor collecting chamber to a carburetor of the engine to remove volatiles from the chamber and mix them with gasoline for burning in the engine.

9. A device as defined in claim 6 wherein a transparent front plate member extends along said enclosing housing in a spaced relation above said wall member for enabling an operator to view the movement of the oil downwardly along said wall member.

References Cited
UNITED STATES PATENTS 2,909,284   10/1959   Watkins _____ 208—179 X LAVERNE D. GEIGER, *Primary Examiner.*

H. S. BELL, *Assistant Examiner.*